(12) United States Patent
Dai et al.

(10) Patent No.: US 8,855,663 B2
(45) Date of Patent: Oct. 7, 2014

(54) METHOD AND APPARATUS FOR TERMINAL ACCESS

(75) Inventors: Fengyan Dai, Guangdong Province (CN); Yun Cao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 387 days.

(21) Appl. No.: 13/257,778

(22) PCT Filed: Nov. 17, 2010

(86) PCT No.: PCT/CN2010/078823
§ 371 (c)(1),
(2), (4) Date: Dec. 6, 2011

(87) PCT Pub. No.: WO2011/060719
PCT Pub. Date: May 26, 2011

(65) Prior Publication Data
US 2012/0115436 A1 May 10, 2012

(30) Foreign Application Priority Data
Nov. 23, 2009 (CN) .......................... 2009 1 0222939

(51) Int. Cl.
*H04W 72/00* (2009.01)
*H04W 48/06* (2009.01)
*H04W 28/02* (2009.01)

(52) U.S. Cl.
CPC .............. *H04W 48/06* (2013.01); *H04W 28/02* (2013.01)
USPC ..... 455/453; 455/432.1; 455/436; 455/452.2; 455/442; 455/452.1; 370/331; 370/332; 370/333; 370/338

(58) Field of Classification Search
CPC ....... H04W 8/12; H04W 48/18; H04W 36/16; H04W 36/30; H04W 28/08; H04W 24/00
USPC ................................ 455/432.1–453; 370/331
See application file for complete search history.

(56) References Cited

U.S. PATENT DOCUMENTS 7,471,654 B2 * 12/2008 Mueckenheim et al. ...... 370/329
8,331,278 B2 * 12/2012 Song ............................. 370/312
(Continued)

FOREIGN PATENT DOCUMENTS

| CN | 1380762 A | 11/2002 |
|---|---|---|
| CN | 1802003 A | 7/2006 |
| CN | 101197766 A | 6/2008 |

(Continued)

OTHER PUBLICATIONS

International Search Report for PCT/CN2010/078823 dated Feb. 10, 2011.

*Primary Examiner* — Dai A Phuong
(74) *Attorney, Agent, or Firm* — Stephen Yang; Ling Wu; Ling and Yang Intellectual Property

(57) ABSTRACT

The present invention discloses a method for terminal access, and this method includes: receiving an access request sent by a terminal; analyzing the access request to obtain a service type of the terminal; determining a number of residual equivalent users according to a difference between an access equivalent user number threshold corresponding to the service type of the terminal currently and a number of accessed terminals; and determining whether to respond to the access request according to the number of the residual equivalent users and a preset minimum residual equivalent user threshold. The present invention further discloses an apparatus for accessing the terminal. With the present invention, dynamic variation of the wireless environment can be adapted, QoS with higher quality can be provided for the users, and the experience and the feeling of the users are improved.

13 Claims, 3 Drawing Sheets

(56) References Cited

U.S. PATENT DOCUMENTS

| | | | |
|---|---|---|---|
| 2002/0018554 A1* | 2/2002 | Jensen et al. | 379/265.01 |
| 2004/0082363 A1 | 4/2004 | Hosein | |
| 2007/0026865 A1* | 2/2007 | Yano et al. | 455/438 |
| 2009/0196230 A1* | 8/2009 | Kim et al. | 370/328 |

FOREIGN PATENT DOCUMENTS

| | | |
|---|---|---|
| CN | 101720117 A | 6/2010 |

* cited by examiner

METHOD AND APPARATUS FOR TERMINAL ACCESS

TECHNICAL FIELD

The present invention relates to the filed of communication, and in particular, to a method and an apparatus for terminal access.

BACKGROUND ART

With the development and popularization of mobile communication services, the range of usable service types of mobile communication users after 3G has become wider and wider, terminals satisfying different service types need to perform the admission control detection after accessing a certain sector of the system so as to not only be able to ensure the services needed by the terminal, but also be able to not affect other accessed terminals of the system after the terminal satisfying different service types accessing the system.

Currently there are two processing methods:

one is that the normalized number of users of the call request initiated by the terminal is calculated according to the service type, transmission rate and the quality of service of the accessed terminals, and the normalized number of users is compared with a configuration threshold to determine whether to perform new user access, wherein the configuration threshold used in the method is a static configuration threshold, which cannot be dynamically adjusted according to the real-time condition of the wireless network;

the other one is a method of controlling the reverse user access using uplink total interference, wherein the method also needs to configure a basic user threshold in advance, thresholds are configured for different types of users, and when performing new user access, the access type of the user is firstly judged, and then it is determined whether to perform the user access according to a result obtained by calculating whether the total number of the users of this type exceeds the corresponding configuration threshold; similar to the previous method, there is also the problem that the static configuration threshold is not flexible and cannot be dynamically adjusted according to the real-time condition of the wireless network; in addition, this method only mentions performing admission control on uplink users, and does not mention performing admission control on downlink/forward accessed users, but when services of the system are busy, admission control also needs to be performed on the forward accessed user to ensure that the user can obtain the required services.

In a word, the common problem of the current two processing methods is that the static configuration threshold cannot adapt to the case that the access ability of the system dynamically varies depending on the wireless environment, or it cannot be ensured that the new user is provided with the required Quality of Service (QoS) after this new user accessing the system. Even in a situation that the wireless environment of the system is rather bad, the newly accessed user cannot obtain the required QoS, and meanwhile the QoS of the users that have already accessed the system will even be reduced, which causes reduction of use feeling of all users under a certain sector of the system.

SUMMARY OF THE INVENTION

Examples of the present invention provide a method for terminal access for adapting to the dynamic change of the wireless environment, providing QoS of the higher quality for the users, and improving user experience and feeling. The method comprises:

receiving an access request sent by a terminal;

analyzing the access request to obtain a service type of the terminal;

determining a number of residual equivalent users according to a difference between an access equivalent user number threshold corresponding to the service type of the terminal currently and a number of accessed terminals; and, determining whether to respond to the access request according to the number of the residual equivalent users and a preset minimum residual equivalent user threshold.

In the method, said step of determining whether to respond to the access request according to the number of the residual equivalent users and the preset minimum residual equivalent user threshold comprises:

judging whether the number of the residual equivalent users is larger than the preset minimum residual equivalent user threshold, if yes, responding to the access request, and performing terminal access, and if not, rejecting the access request.

In the method, said step of determining the number of residual equivalent users comprises: determining a number of forward residual equivalent users and/or a number of reverse residual equivalent users.

In the method, the number of forward residual equivalent users is determined according to a following formula:

$$\text{DynamicUserThreshold}F=(\text{Thrupt}F/\text{Idle}T\times\text{Factor}Fu-\text{Thrupt}F)/\text{BandReq}F;$$

wherein DynamicUserThresholdF is the number of forward residual equivalent users, ThruptF is a forward average throughput, IdleT is a timeslot occupancy ratio, FactorFu is a forward equivalent user adjustment factor, and BandReqF is a forward bandwidth rate.

In the method, the number of reverse residual equivalent users is determined according to a following formula:

$$\text{DynamicUserThreshold}R=(\text{Thrupt}R/\text{RABIdleRatio}\times\text{Factor}Ru-\text{Thrupt}R)/\text{BandReq}R;$$

wherein DynamicUserThresholdR is the number of reverse residual equivalent users, ThruptR is a reverse average throughput, RABIdleRatio is a Reverse Activity Bit (RAB) reverse idle ratio, FactorRu is a reverse equivalent user adjustment factor, and BandReqR is a reverse bandwidth rate.

In the method, said step of judging whether the number of the residual equivalent users is larger than the preset minimum residual equivalent user threshold comprises:

judging whether both the number of forward residual equivalent users and the number of reverse residual equivalent users are larger than the preset minimum residual equivalent user threshold.

In the method, when the number of residual equivalent users is not larger than the preset minimum residual equivalent user threshold, the method further comprises:

based on an overload control policy that has been stored, selecting a terminal that meets the overload control policy from accessed terminals, and releasing resources occupied by the terminal; and, responding to the access request and performing terminal access using the released resources.

In the method, the overload control policy comprises:

always not releasing terminals of a service type; or, selecting terminals of a specified service type, and releasing resources occupied by the terminals.

Examples of the present invention also provides an apparatus for terminal access for adapting to the dynamic change of the wireless environment, providing QoS of higher quality for the users, and improving the experience and feeling of the users. The apparatus comprises a receiving unit, an analyzing unit, a first determining unit and a second determining unit, wherein the receiving unit is configured to: receive an access request sent by a terminal;

the analyzing unit is configured to: analyze the access request to obtain a service type of the terminal;

the first determining unit is configured to: determine a number of residual equivalent users according to a difference between an access equivalent user number threshold corresponding to the service type of the terminal currently and a number of accessed terminals;

the second determining unit is configured to: determine whether to respond to the access request according to the number of the residual equivalent users and a preset minimum residual equivalent user threshold.

In the apparatus, the second determining unit comprises a judging sub-unit, an accessing sub-unit and a rejecting sub-unit;

the judging sub-unit is configured to: judge whether the number of the residual equivalent users is larger than the preset minimum residual equivalent user threshold, and if yes, trigger the accessing sub-unit, if not, trigger the rejecting sub-unit;

the accessing sub-unit is configured to: respond to the access request and perform terminal access;

the rejecting sub-unit is configured to: reject the access request.

In the apparatus, the first determining unit is configured to: determine a number of forward residual equivalent users and/or a number of reverse residual equivalent users.

In the apparatus, the judging sub-unit is configured to: judge whether both the number of forward residual equivalent users and the number of reverse residual equivalent users are larger than the preset minimum residual equivalent user threshold, if yes, trigger the accessing sub-unit, and if not, trigger the rejecting sub-unit.

The above apparatus further comprises:

a releasing unit, which is configured to: select a terminal that meets an overload control policy from accessed terminals based on the overload control policy that has been stored, and release resources occupied by the terminal; and an accessing unit, which is configured to: respond to the access request and perform terminal access using the released resources.

In the examples of the present invention, an access request sent by a terminal is received, and then the access request is analyzed to obtain the service type of the terminal. As for a system, the numbers of accessible terminals are not totally the same for different service types, meanwhile, the numbers of accessible terminals corresponding to a certain service type in different times are also different due to the change of the wireless environment of the system, that is, the access equivalent user number threshold corresponding to the service type of the terminal dynamically varies depending on the wireless environment. In the examples of the present invention, the number of residual equivalent users is determined according to the access equivalent user number threshold corresponding to the service type of the terminal currently and the number of accessed terminals, thereby adapting to the dynamic change of the wireless environment of the system. At the time when the number of the residual equivalent users is larger than the preset minimum residual equivalent user threshold, i.e., at the time when the system has a better wireless environment and has enough resources and a new terminal is able to access the system, the system responds to the access request, and the terminal accesses the system, that is, the required QoS can be provided for the accessed terminal without affecting the QoS of other accessed users. At the time when the number of the residual equivalent users is not larger than the preset minimum residual equivalent user threshold, i.e., the system has a worse wireless environment and does not have enough resources for accessing any new terminal, the access request is rejected so as to avoid reduction of QoS of other accessed users and improve feeling and experience of the user.

PREFERRED EMBODIMENTS OF THE INVENTION

Figure 1:
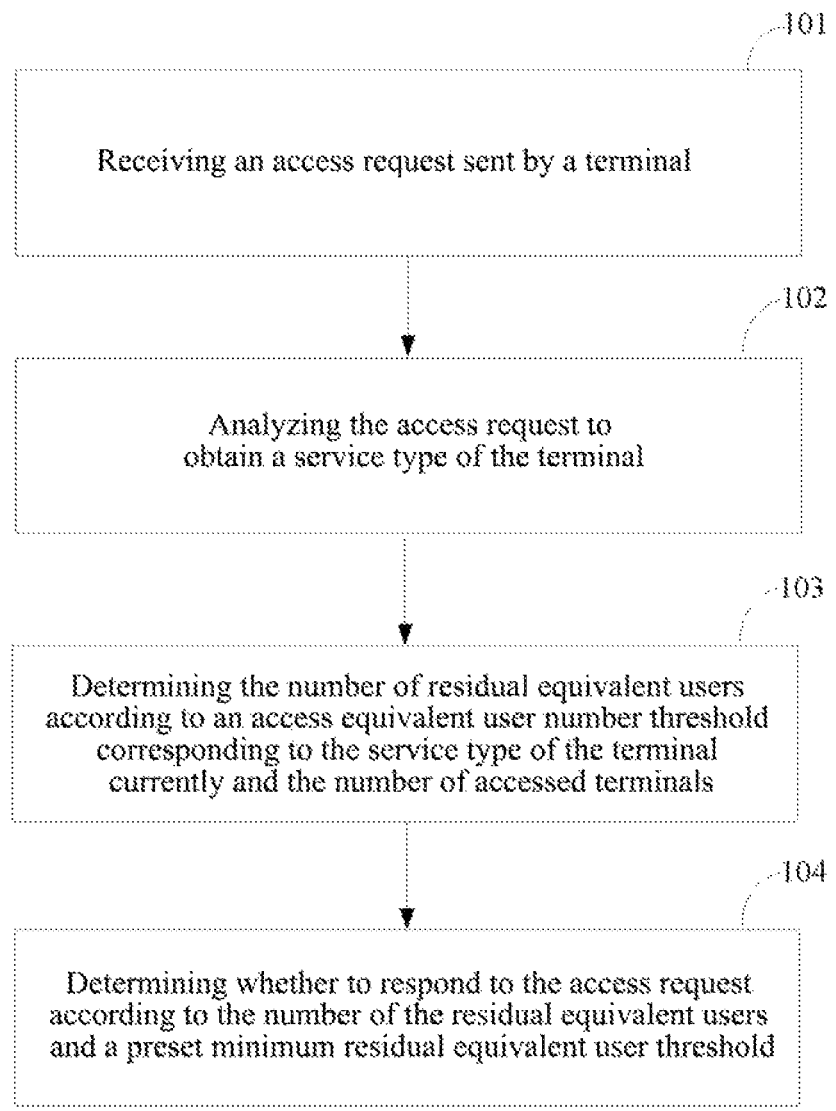
FIG. 1 is a specific flow chart of the method for terminal access provided by an example of the present invention.

In order to solve the problem mentioned in Background Art that the access equivalent user number threshold cannot be dynamically adjusted according to the real-time condition of the wireless environment of the system, therefore, in a situation that the wireless environment of the system is rather bad, the newly accessed user cannot obtain the required QoS, and meanwhile the QoS of the users that have already accessed the system will even be reduced, thereby affecting the experience and feeling of the users. The example of the present invention provides a method for terminal access, and the specific flow of which is as shown in FIG. 1, comprising:

step 101, an access request sent by a terminal is received;

step 102, the access request is analyzed to obtain a service type of the terminal;

step 103, the number of residual equivalent users is determined according to a difference between an access equivalent user number threshold corresponding to the service type of the terminal currently and the number of accessed terminals; and, step 104, whether to respond to the access request is determined according to the number of the residual equivalent users and a preset minimum residual equivalent user threshold.

As shown in FIG. 1, when step 102 is executed, the access request is analyzed to obtain a service type of the terminal, besides, other related information corresponding to the terminal, for example, the user identifier, the forward/reverse identifier, and the applied rate and so on, can also be obtained according to practical conditions.

As shown in FIG. 1, when step 103 is executed, the access equivalent user number threshold corresponding to the service type of the terminal currently and the number of accessed terminals are obtained, and as mentioned in the Background Art, the wireless environment of the system dynamically varies, therefore, the access equivalent user number threshold corresponding to the service type of the terminal also dynamically varies depending on the wireless environment of the system, and accordingly, it needs to determine the access equivalent user number threshold corresponding to the service type of the terminal currently in order to ensure that the access equivalent user number threshold can be adjusted dynamically according to the real-time condition of the wireless environment of the system and to provide higher QoS for the user, and the number of residual equivalent users determined according to the access equivalent user number threshold corresponding to the service type of the terminal currently and the number of accessed terminals also dynamically varies depending on the wireless environment.

Figure 2:
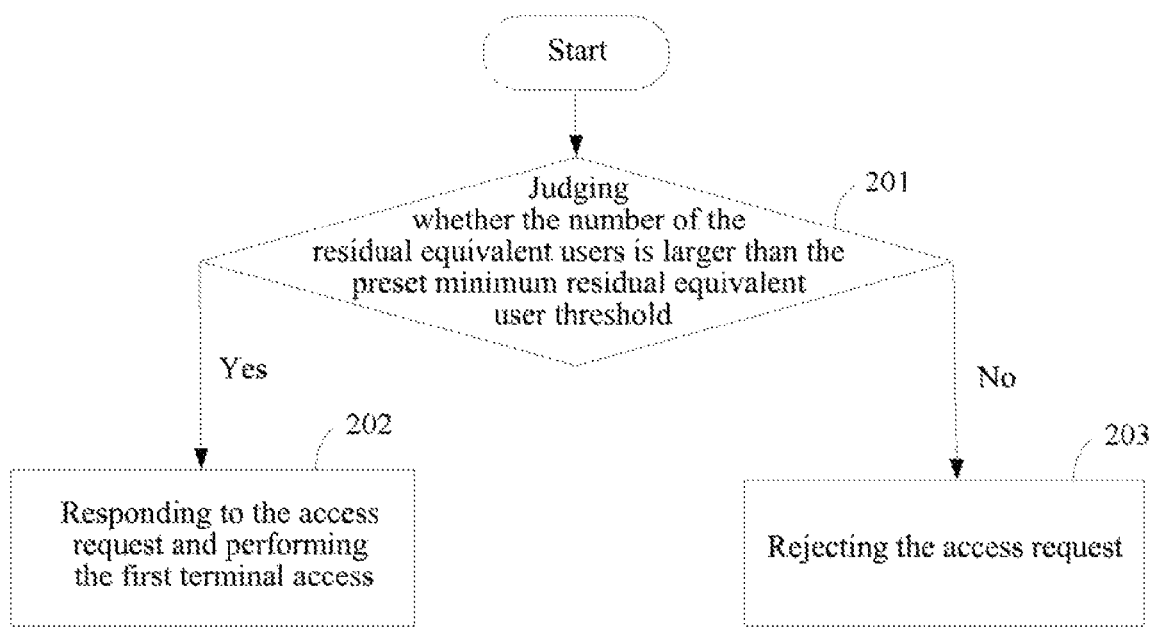
FIG. 2 is a specific flow chart of determining whether to access the terminal according to the number of residual equivalent users provided by an example of the present invention.

As shown in FIG. 1, when step 104 is executed, whether to respond to the access request is determined according to the number of the residual equivalent users and a preset minimum residual equivalent user threshold, and specific determining mode is as shown in FIG. 2:

step 201, whether the number of the residual equivalent users is larger than the preset minimum residual equivalent user threshold is judged, and if yes, step 202 is executed, if not, step 203 is executed;

step 202, responding to the access request is made and the terminal access is performed;

Step 203: the access request is rejected.

In specific implementation, there may be other modes for determining whether to respond to the access request, depending on specific conditions.

In implementation, as the flows shown in FIG. 1 and FIG. 2, when step 103 is executed, since users can access both forward channel and reverse channel, the step of determining the number of residual equivalent users can further comprise: determining the number of forward residual equivalent users and/or the number of reverse residual equivalent users.

In specific implementation, whether to perform the terminal access can be judged according to either one of the number of forward residual equivalent users and the number of reverse residual equivalent users, or according to a combination of the number of forward residual equivalent users and the number of reverse residual equivalent users. For example, when the number of forward residual equivalent users is larger than the preset minimum residual equivalent user threshold, responding to the access request is made and the terminal is allowed to access the system, but when the number of forward residual equivalent users is not larger than the preset minimum residual equivalent user threshold, the access request is rejected and the terminal is refused to access the system. Or, when the number of reverse residual equivalent users is larger than the preset minimum residual equivalent user threshold, responding to the access request is made and the terminal is allowed to access the system, but when the number of reverse residual equivalent users is not larger than the preset minimum residual equivalent user threshold, the terminal is refused to access the system.

In implementation, the number of forward residual equivalent users can be determined according to the following formula:

$$DynamicUserThresholdF=(ThruptF/IdleT \times FactorFu-ThruptF)/BandReqF;$$

wherein DynamicUserThresholdF is the number of forward residual equivalent users, ThruptF is the forward average throughput, IdleT is the timeslot occupancy ratio, FactorFu is the forward equivalent user adjustment factor, and BandReqF is the forward bandwidth rate, wherein the forward average throughput ThruptF and the timeslot occupancy ratio IdleT are reported periodically by the base station.

In implementation, the formulas for determining the number of forward residual equivalent users can also be other formulas, and are not only limited to the one provided in the example of the present invention, and which formula is used will be determined according to specific situations.

In implementation, the number of reverse residual equivalent users can be determined according to the following formula:

$$DynamicUserThresholdR=(ThruptR/RABIdleRatio \times FactorRu-ThruptR)/BandReqR;$$

wherein DynamicUserThresholdR is the number of reverse residual equivalent users, ThruptR is the reverse average throughput, RABIdleRatio is Reverse Activity Bit (RAB) reverse idle ratio, FactorRu is the reverse equivalent user adjustment factor, and BandReqR is reverse bandwidth rate, wherein the RAB reverse idle ratio RABIdleRatio and the reverse average throughput ThruptR are reported periodically by the base station.

In implementation, the formulas for determining the number of reverse residual equivalent users can also be other formulas, and are not only limited to the one provided in the example of the present invention, and which formula is used will be determined according to specific situations.

Figure 3:
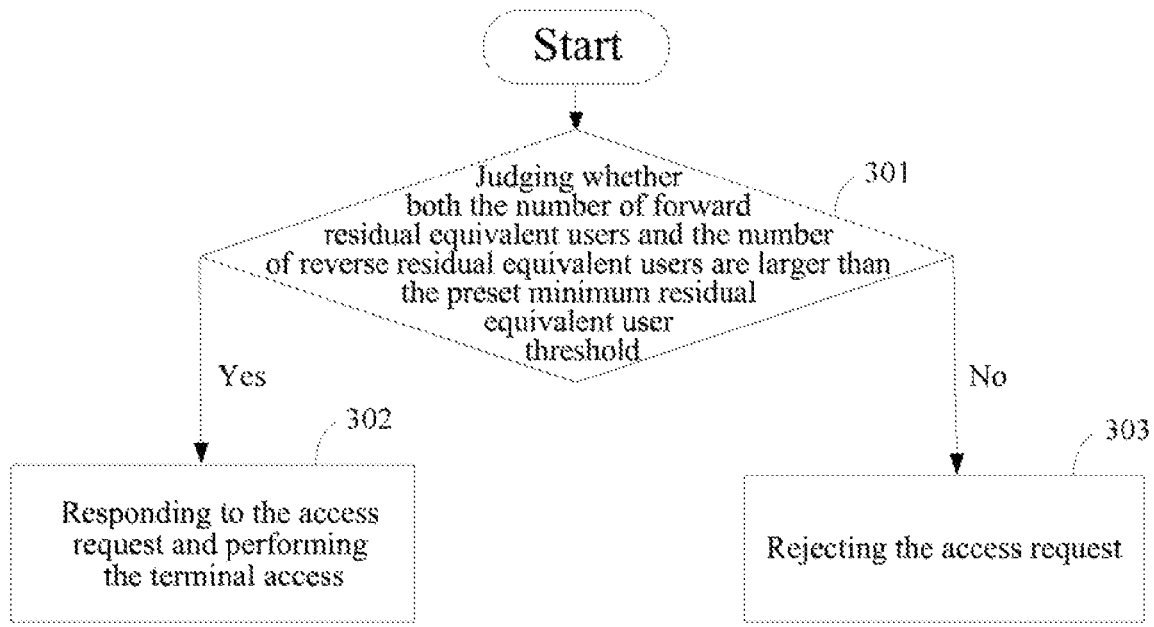
FIG. 3 is a specific flow chart of determining whether to access the terminal according to the number of forward residual equivalent users and the number of reverse residual equivalent users provided by an example of the present invention.

In order to ensure the QoS of the accessed users in the system and to avoid the disadvantage mentioned in Background Art that admission control is only performed on uplink (i.e., reverse) accessed users but not for downlink (i.e., forward) accessed users, the example of the present invention provides an optimal example, i.e., whether a terminal can access the system is judged according to a combination of the number of forward residual equivalent users and the number of reverse residual equivalent users, the specific embodiment of which is shown in FIG. 3:

step 301, whether both the number of forward residual equivalent users and the number of reverse residual equivalent users are larger than the preset minimum residual equivalent user threshold is judged, and if yes, step 302 is executed, if not, step 303 is executed;

step 302, responding to the access request is made and perform the terminal access;

step 303: the access request is rejected.

As the flow shown in FIG. 3, when step 301 is executed, only one minimum residual equivalent user threshold may be preset and both the number of forward residual equivalent users and the number of reverse residual equivalent users are compared with this preset minimum residual equivalent user threshold; or the first minimum residual equivalent user threshold is configured for the forward channel and the second minimum residual equivalent user threshold is configured for the reverse channel, and then the number of forward residual equivalent users is compared with the first minimum residual equivalent user threshold and the number of reverse residual equivalent users is compared with the second minimum residual equivalent user threshold, wherein the values of the first and second minimum residual equivalent user thresholds should be not smaller than the preset minimum residual equivalent user threshold certainly. In implementation, the value of the preset minimum residual equivalent user threshold may be a fractional value less than 1, or any value larger than 1, depending on the practical conditions.

Now depiction will be made with reference to a specific example. In this example, please see Table 1 and Table 2 respectively for the number of forward residual equivalent users and the number of reverse residual equivalent users as well as the parameters for determining the two numbers:

TABLE 1

| User Information | Information Reported by the Base Station | Forward Equivalent User Adjusting Factor FactorFu | The Number of Forward Residual Equivalent Users |
|---|---|---|---|
| BandReqF = 50 kbps | ThruptF = 500 kbps IdleT = 0.46 | 0.8 | 7 |

TABLE 2

| User Information | Information Reported by the Base Station | Reverse Equivalent User Adjusting Factor FactorRu | The Number of Reverse Residual Equivalent Users |
|---|---|---|---|
| BandReqR = 45 kbps; | ThruptR = 346 kbps RABIdleRatio = 0.56 | 0.6 | 6 |

The minimum residual equivalent user threshold is configured to be 1, and it can be definitely deduced from the data in Table 1 and Table 2 that both the number of forward residual equivalent users 7 and the number of reverse residual equivalent users 6 are larger than the minimum residual equivalent user threshold 1, and therefore, the responding to the access request can be made and the terminal access can be performed.

In implementation, if the number of residual equivalent users is not larger than the preset minimum residual equivalent user threshold, a terminal that meets the overload control policy may be selected from accessed terminals based on the overload control policy that has been stored, and the resources occupied by the terminal are released; responding to the access request is made and the terminal access is performed using the released resources.

The overload policy can be composed of multiple types of information, for example, it can be configured according to information of the users of each service type such as forward/reverse total throughput, the on-line time, the idle time, and the user level and so on. During the configuration, the priories of different information can be determined according to practical conditions.

In implementation, based on the overload control policy, it may be selected to always not release terminals of a certain service type, or selected to release resources occupied by terminals of a certain service type, thereby using the released resources to perform the new user access. In this way, the system can be selectively accepted even if the system is very busy, which can improve the experience and feeling of the users.

Figure 4:
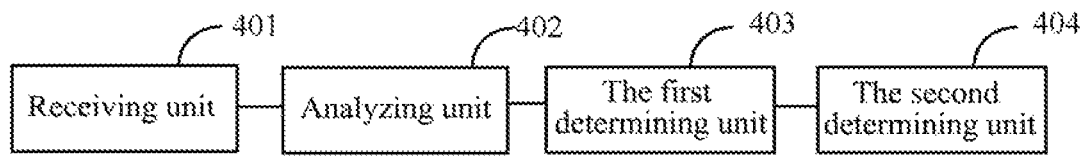
FIG. 4 is a structure schematic diagram of the apparatus for terminal access provided by an example of the present invention.

Based on the same inventive concept, the example of the present invention further provides an apparatus for terminal access, which, specifically as shown in FIG. 4, comprises a receiving unit 401, an analyzing unit 402, the first determining unit 403 and the second determining unit 404:

the receiving unit 401 is used to receive an access request sent by a terminal;

the analyzing unit 402 is used to analyze the access request to obtain a service type of the terminal;

the first determining unit 403 is used to determine the number of residual equivalent users according to an access equivalent user number threshold corresponding to the service type of the terminal currently and the number of accessed terminals;

the second determining unit 404 is used to determine whether to respond to the access request according to the number of the residual equivalent users determined by the first determining unit 403 and a preset minimum residual equivalent user threshold.

Figure 5:
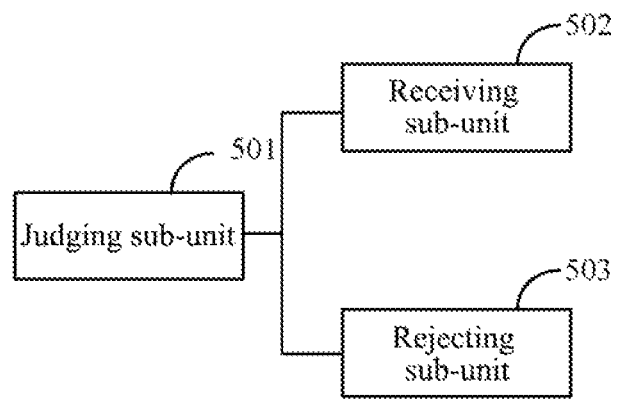
FIG. 5 is a structure schematic diagram of the second determining unit provided by an example of the present invention.

In an example, as the flow shown in FIG. 5, the second determining unit 404 may comprise:

a judging sub-unit 501, which is used to judge whether the number of the residual equivalent users is larger than the preset minimum residual equivalent user threshold, and if yes, trigger the accessing sub-unit 502, if not, trigger the rejecting sub-unit 503;

the accessing sub-unit 502 used to respond to the access request and perform the terminal access;

the rejecting sub-unit 503 used to reject the access request.

In an example, the first determining unit 403 may be further used to determine the number of forward residual equivalent users and/or the number of reverse residual equivalent users.

In an example, the first determining unit 403 can determine the number of forward residual equivalent users according to the following formula:

$$\mathrm{DynamicUserThreshold}F = (\mathrm{Thrupt}F/\mathrm{Idle}T \times \mathrm{Factor}Fu - \mathrm{Thrupt}F)/\mathrm{BandReq}F;$$

wherein DynamicUserThresholdF is the number of forward residual equivalent users, ThruptF is the forward average throughput, IdleT is the timeslot occupancy ratio, FactorFu is the forward equivalent user adjustment factor, and BandReqF is the forward bandwidth rate.

In an example, the first determining unit 403 can determine the number of reverse residual equivalent users according to the following formula:

$$\mathrm{DynamicUserThreshold}R = (\mathrm{Thrupt}R/\mathrm{RABIdleRatio} \times \mathrm{Factor}Ru - \mathrm{Thrupt}R)/\mathrm{BandReq}R;$$

wherein DynamicUserThresholdR is the number of reverse residual equivalent users, ThruptR is the reverse average throughput, RABIdleRatio is the RAB reverse idle ratio, FactorRu is the reverse equivalent user adjustment factor, and BandReqR is the reverse bandwidth rate.

In an example, the judging sub-unit 501 may be further used to judge whether both the number of forward residual equivalent users and the number of reverse residual equivalent users are larger than the preset minimum residual equivalent user threshold, and if yes, trigger the accessing sub-unit 502, if not, trigger the rejecting sub-unit 503.

Figure 6:
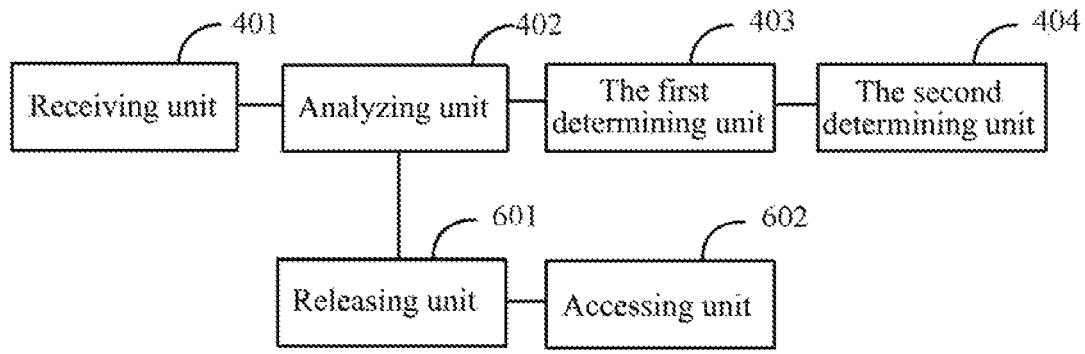
FIG. 6 is another structure schematic diagram of the apparatus for terminal access provided by an example of the present invention.

In an example, as shown in FIG. 6, the apparatus for terminal access may further comprise:

a releasing unit 601, which is used to select a terminal that meets an overload control policy from accessed terminals based on the overload control policy that has been stored, and release resources occupied by the terminal; and an accessing unit 602, which is used to respond to the access request and perform the terminal access using the released resources.

In the examples of the present invention, an access request sent by a terminal is received, and then the access request is analyzed to obtain the service type of the terminal. As for a system, the numbers of accessible terminals are not totally the same for different service types, meanwhile, the numbers of accessible terminals corresponding to a certain service type in different times are also different due to the change of the wireless environment of the system, that is, the access equivalent user number threshold corresponding to the service type of the terminal dynamically varies depending on the wireless environment. In the examples of the present invention, the number of residual equivalent users is determined according to the access equivalent user number threshold corresponding to the service type of the terminal currently and the number of accessed terminals, thereby adapting to the dynamic change of the wireless environment of the system. At the time when the number of the residual equivalent users is larger than the preset minimum residual equivalent user threshold, i.e., at the time when the system has a better wireless environment and has enough resources and a new terminal is able to access the system, the system responds to the access request, and the terminal accesses the system, that is, the required QoS can be provided for the accessed terminal without affecting the QoS of other accessed users. At the time when the number of the residual equivalent users is not larger than the preset minimum residual equivalent user threshold, i.e., the system has a worse wireless environment and does not have enough resources for performing any new terminal access, the access request is rejected so as to avoid reduction of QoS of other accessed users and improve feeling and experience of the user.

Furthermore, in implementation, based on the overload control policy, it may select terminals of a certain service type and release resources occupied by the terminals, thereby using the released resources to perform new user access. In this way, new users can be selectively accepted even if the system is very busy, which can improve the experience and feeling of the users.

Although preferred examples of the present invention have been disclosed for the purpose of demonstration, a person having ordinary skill in the art will realize that there may be various improvements, additions and substitutions, and therefore, the scope of the present invention should not be limited to the above examples.

A person having ordinary skill in the art can appreciate that all or parts of the steps of the above method may be implemented by instructing related hardware with a program, which may be stored in a computer-readable medium, such as a read-only memory, a magnetic disk or an optical disk and so on. Optionally, all or parts of the steps of the above examples may also be implemented by using one or more integrated circuits. Correspondingly, each module/unit in the above examples may be implemented in the form of hardware, or in the form of software functional modules. The present invention is not limited to any particular form of the combination of hardware and software.

INDUSTRIAL APPLICABILITY

The present invention can provide required QoS for the accessed terminal without affecting the QoS of other accessed users, thereby avoiding reduction of QoS of other accessed users and improving the feeling and experience of the user.

What is claimed is:

1. A method for terminal access, which comprises:
receiving an access request sent by a terminal;
analyzing the access request to obtain a service type of the terminal;
determining a number of residual equivalent users according to a difference between an access equivalent user number threshold corresponding to the service type of the terminal currently and a number of accessed terminals; and,
determining whether to respond to the access request according to the number of the residual equivalent users and a preset minimum residual equivalent user threshold by judging whether the number of the residual equivalent users is larger than the preset minimum residual equivalent user threshold, and if yes, responding to the access request, and performing terminal access, if not, rejecting the access request;
wherein the access equivalent user number threshold corresponding to the service type of the terminal changes dynamically with the change of a wireless environment, and the number of the residual equivalent users also changes dynamically with the change of the wireless environment.

2. The method according to claim 1, wherein said step of determining the number of residual equivalent users comprises: determining a number of forward residual equivalent users and/or a number of reverse residual equivalent users.

3. The method according to claim 2, wherein the number of forward residual equivalent users is determined according to a following formula:

$$\text{DynamicUserThreshold}F = (\text{Thrupt}F/\text{Idle}T \times \text{Factor}Fu - \text{Thrupt}F)/\text{BandReq}F;$$

wherein DynamicUserThresholdF is the number of forward residual equivalent users, ThruptF is a forward average throughput, IdleT is a timeslot occupancy ratio, FactorFu is a forward equivalent user adjustment factor, and BandReqF is a forward bandwidth rate.

4. The method according to claim 2, wherein, the number of reverse residual equivalent users is determined according to a following formula:

$$\text{DynamicUserThreshold}R = (\text{Thrupt}R/\text{RABIdleRatio} \times \text{Factor}Ru - \text{Thrupt}R)/\text{BandReq}R;$$

wherein DynamicUserThresholdR is the number of reverse residual equivalent users, ThruptR is a reverse average throughput, RABIdleRatio is a Reverse Activity Bit (RAB) reverse idle ratio, FactorRu is a reverse equivalent user adjustment factor, and BandReqR is a reverse bandwidth rate.

5. The method according to claim 2, wherein said step of judging whether the number of the residual equivalent users is larger than the preset minimum residual equivalent user threshold comprises:
judging whether both the number of forward residual equivalent users and the number of reverse residual equivalent users are larger than the preset minimum residual equivalent user threshold.

6. The method according to claim 1, when the number of residual equivalent users is not larger than the preset minimum residual equivalent user threshold, the method further comprising:
based on an overload control policy that has been stored, selecting a terminal that meets the overload control policy from accessed terminals, and releasing resources occupied by the terminal; and,
responding to the access request and performing terminal access using the released resources.

7. The method according to claim 6, wherein the overload control policy comprises:
always not releasing terminals of a service type; or,
selecting terminals of a specified service type, and releasing resources occupied by the terminals.

8. An apparatus for terminal access, which comprises a receiving unit, an analyzing unit, a first determining unit and a second determining unit, wherein the receiving unit is configured to: receive an access request sent by a terminal;

the analyzing unit is configured to: analyze the access request to obtain a service type of the terminal;

the first determining unit is configured to: determine a number of residual equivalent users according to a difference between an access equivalent user number threshold corresponding to the service type of the terminal currently and a number of accessed terminals;

the second determining unit is configured to: determine whether to respond to the access request according to the number of the residual equivalent users and a preset minimum residual equivalent user threshold;

wherein the second determining unit comprises a judging sub-unit, an accessing sub-unit and a rejecting sub-unit;

the judging sub-unit is configured to: judge whether the number of the residual equivalent users is larger than the preset minimum residual equivalent user threshold, and if yes, trigger the accessing sub-unit, if not, trigger the rejecting sub-unit;

the accessing sub-unit is configured to: respond to the access request and perform terminal access;

the rejecting sub-unit is configured to: reject the access request;

wherein the access equivalent user number threshold corresponding to the service type of the terminal changes dynamically with the change of a wireless environment, and the number of the residual equivalent users also changes dynamically with the change of the wireless environment.

9. The apparatus according to claim 8, wherein the first determining unit is configured to: determine a number of forward residual equivalent users and/or a number of reverse residual equivalent users.

10. The apparatus according to claim 9, wherein the judging sub-unit is configured to: judge whether both the number of forward residual equivalent users and the number of reverse residual equivalent users are larger than the preset minimum residual equivalent user threshold, and if yes, trigger the accessing sub-unit, if not, trigger the rejecting sub-unit.

11. The apparatus according to claim 8, further comprising:

a releasing unit, which is configured to: select a terminal that meets an overload control policy from accessed terminals based on the overload control policy that has been stored, and release resources occupied by the terminal; and an accessing unit, which is configured to: respond to the access request and perform terminal access using the released resources.

12. The apparatus according to claim 8, wherein the first determining unit is configured to: determine a number of forward residual equivalent users and/or a number of reverse residual equivalent users.

13. The apparatus according to claim 12, wherein the judging sub-unit is configured to: judge whether both the number of forward residual equivalent users and the number of reverse residual equivalent users are larger than the preset minimum residual equivalent user threshold, and if yes, trigger the accessing sub-unit, if not, trigger the rejecting sub-unit.

* * * * *